United States Patent [19]

Saito et al.

[11] 3,993,740

[45] Nov. 23, 1976

[54] PROCESS FOR THE PRODUCTION OF FIBROUS POTASSIUM TITANATE

[75] Inventors: Hajime Saito, Aichi; Iwao Yamai, Nagoya, both of Japan

[73] Assignee: Central Glass Co., Ltd., Japan

[22] Filed: June 27, 1975

[21] Appl. No.: 590,943

[30] Foreign Application Priority Data

July 5, 1974 Japan.............................. 49-76422

[52] U.S. Cl........................... 423/598; 264/DIG. 19
[51] Int. Cl.$^2$......................................... C01G 23/00
[58] Field of Search............... 423/598; 264/DIG. 19

[56] References Cited
UNITED STATES PATENTS

| | | | |
|---|---|---|---|
| 2,833,620 | 5/1958 | Grei et al............................ | 423/598 |
| 2,841,470 | 7/1958 | Berry.................................. | 423/598 |
| 3,129,105 | 4/1964 | Berry et al.......................... | 423/598 |
| 3,328,117 | 6/1967 | Emsile et al........................ | 423/598 |
| 3,331,658 | 7/1967 | Lewis et al......................... | 423/598 |
| 3,380,847 | 4/1968 | Lewis et al......................... | 423/598 |
| 3,737,520 | 6/1973 | Jacobson ........................... | 423/598 |
| 3,760,068 | 9/1973 | Winter et al....................... | 423/598 |

*Primary Examiner*—Herbert T. Carter
*Attorney, Agent, or Firm*—Wenderoth, Lind & Ponack

[57] ABSTRACT

In the production of fibrous potassium titanate by the hydrothermal reaction of a mixture of a tetravalent titanium compound and a potassium compound in an aqueous alkaline solution at a high temperature under a high pressure, the hydrothermal reaction is carried out in the presence of at least one member selected from the group consisting of compounds of titanium having less than four valencies, metallic titanium and mixtures thereof, while removing a part of water formed during the reaction from the reaction system.

6 Claims, No Drawings

PROCESS FOR THE PRODUCTION OF FIBROUS POTASSIUM TITANATE

BACKGROUND OF THE INVENTION

This invention relates to a process for the production of potassium titanate long fibers.

It has hitherto been known to produce fibrous potassium titanate by the so-called hydrothermal process in which a mixture of a tetravalent titanium compound and potassium compound is reacted in an aqueous alkaline solution at a high temperature and pressure in a pressure vessel. However, the hydrothermal reaction technique of the prior art has disadvantages in that it not only requires a considerably high temperature, high pressure and long reaction time, for example, at least 400° C, 200 atmospheres (often 3000 atmospheres) and 70 hours, but also the formation of the fiber is stopped after a certain period of time. This is because, in spite of the above, the prior art process requires a concentrated alkaline solution to form good fibers. The alkaline concentration is gradually lowered by water formed during the reaction according to the following equation:

$$6TiO_2 \cdot nH_2O + 2KOH = K_2Ti_6O_{13} + (n + 1)H_2O \qquad (1)$$

The inventors have already proposed an improved hydrothermal process to overcome these disadvantages, in which the hydrothermal reaction is carried out with the removal of water present in the reaction system or formed during the reaction by using a metal having a larger ionization tendency than hydrogen or by a physical dehydrating method (Japanese patent application No. 114364/1973).

In the case of using such a metal in this prior invention, the metal (Me) is gradually oxidized by the following reaction:

$$Me + nH_2O = MeO_n + nH_2 \qquad (2)$$

and the dehydration is thus completed. A similar result can also be obtained by a physical dehydration, for example, removing gradually water by a valve from a pressure vessel instead of using such a chemical dehydrating agent. The physical dehydration is preferably carried out in such a manner that the content of water in the reaction system is decreased at a rate of about 0.2 to 5 % by weight per hour and finally reaches about 5 to 15 % by weight.

The inventors have made successive studies on the above mentioned pressure dehydration method and have found that the production of fibrous potassium titanate according to the pressure dehydration method can be carried out with a further improved yield by using, in addition to a tetravalent titanium compound, a lower valency titanium compound and/or metallic titanium as a raw titanium material. The present invention is based on this finding. This is possibly due to the fact that a lower valency titanium compound or metallic titanium is dissolved in pressurized water and subjected to oxidation reaction to form an activated tetravalent titanium compound which can promote the formation reaction and crystallization of fibrous potassium titanate.

SUMMARY OF THE INVENTION

It is an object of the present invention to improve the above mentioned prior invention which we proposed. It is another object of the invention to provide fibrous potassium titanate of excellent length.

It is a further object of the invention to provide a process for the production of fibrous potassium titanate with a high yield by the pressure dehydration method.

These objects can be accomplished by a process for the production of fibrous potassium titanate, which comprises reacting a mixture of a tetravalent titanium compound and potassium compound in an aqueous alkaline solution at a high temperature and high pressure in the presence of at least one member selected from the group consisting of compounds of titanium having less than four valencies, metallic titanium and mixtures thereof, while removing a part of water from the reaction system during the reaction.

DETAILED DESCRIPTION OF THE INVENTION

The feature of the present invention, therefore, consists of the production of fibrous potassium titanate by reacting a mixture of a tetravalent titanium compound and potassium compound in an aqueous alkaline solution at a high temperature and high pressure, adding at least one member selected from the group consisting of compounds of titanium having less than four valencies, metallic titanium and mixtures thereof to the reaction system from the initial stage and carrying out the reaction with removal of a part of water from the reaction system during the reaction. In the process of the present invention, the water of the reaction system, including the water formed by the reaction of forming fibrous potassium titanate is removed by the use of a chemical dehydrating agent such as, for example a metal having a larger ionization tendency than hydrogen or by a physical dehydrating method. The degree of dehydration is preferably adjusted so that the content of water may be about 5 to 15 % by weight.

Useful examples of the lower valency titanium compound are titanium oxides such as $TiO_{2.0}{\sim}TiO_{1.90}$ ($\alpha$-phase oxide), $TiO_{1.80}{\sim}TiO_{1.70}$ ($\beta$-phase oxide), $TiO_{1.56}{\sim}TiO_{1.48}$ ($\gamma$-phase, ordinarily $Ti_2O_3$), $TiO_{1.25}{\sim}TiO_{0.69}$ ($\delta$-phase, ordinarily TiO) and $TiO_{0.40}{\sim}Ti$ (titanium phase, ordinarily metallic titanium), hydroxides, chlorides, nitrates and sulfates of $Ti^{3+}$ and $Ti^{2+}$. The quantity of the lower valency titanium compound or metallic titanium to be added is in the range of a molar ratio of 0 to 1.0 to a tetravalent titanium compound.

In the process of the invention, as a raw material, there can be used any tetravalent titanium compounds, for example, $TiO_2 \cdot nH_2O$, $TiO_2$, $Ti(OH)_4$, $TiCl_4$, $Ti(NO_3)_4$, $Ti(SO_4)_2$ and the like. As a potassium source there can be used any inorganic potassium compounds, for example, KOH, $K_2CO_3$, KCl, $KNO_3$ and the like. Where desired, a compound having less than four valencies in excess can be fed and in situ oxidized to prepare the corresponding tetravalent titanium compound. As a basic compound there can be used hydroxides and carbonates of alkali metals and alkaline earth metals, for example, sodium, potassium, calcium and magnesium hydroxides or carbonates. Where potassium hydroxide or potassium carbonate is used as a potassium compound, of course, the use of another basic compound is optional.

In the process of the present invention, any metals having a larger ionization tendency than hydrogen can be used for the purpose of dehydration, for example, potassium, sodium, calcium, magnesium, aluminum, zinc, chromium, iron, cobalt, nickel, tin and lead and mixtures thereof. In particular, calcium, magnesium, zinc, aluminum and iron are preferably used. Instead of using the above described chemical dehydrating agents, a method of physical dehydration is available for the same purpose, whereby water is gradually removed from a high pressure vessel by a valve.

A preferred range of mixing ratio of raw materials is generally 1 : 0.5 – 10 : 0 – 10 : 5 – 100 in the form of molar ratio of titanium in titanium compounds (tetravalency and lower valency titanium compounds) : potassium in a potassium compound : hydroxyl group or carbonate group in a basic compound : water. These materials are mixed to prepare a slurry, charged in a pressure vessel with a content of water of about 5 to 80 % by weight and then subjected to a hydrothermal reaction, in general, at a reaction temperature of about 250° to 450° C, preferably about 350° C, under a pressure of about 20 to 400 atmospheres, preferably 200 atmospheres or less for about 3 to 60 hours, preferably 20 to 30 hours.

As will be apparent from the following Examples and Comparative Examples, the addition of a lower valency titanium compound from the initial stage of the reaction of the present invention results in fibrous potassium titanates with excellent fiber length and higher yield than in the case where no lower valency titanium compound is added.

The present invention will be further illustrated in detail in the following Examples and Comparative Examples. It will be evident to those skilled in the art that the ratios, ingredients in the following formulations and the order of operations can be modified within the scope of the present invention. Therefore, the present invention is not to be interpreted as being limited by the following Examples.

EXAMPLE 1

A mixture of 1.8 g of titanium hydroxide ($Ti(OH)_4$) and 0.1 g of titanium sesquioxide ($Ti_2O_3$) and a 2 N aqueous solution of potassium hydroxide were mixed to form a slurry with a molar K/Ti ratio of 2.54, charged in a platinum tube and the tube was placed in a pressure vessel of 130 ml. Then 10 g of zinc was charged in the pressure vessel outside the platinum tube and sealed. The system was heated at 370° C for 20 hours and then allowed to stand for cooling, thus obtaining fibrous potassium titanate having a length of 0.5 mm or more and maximum length of 5 mm with a yield of 40 % by weight.

EXAMPLES 2 TO 14

The procedure of Example 1 was repeated but using various compositions of raw materials, reaction conditions and dehydrating means as shown in Tables 1 and 2 and there were thus obtained various quantities of fibrous potassium titanates.

Table 1

| Example No. | Composition of Raw Materials (Molar Ratio) | | | | |
|---|---|---|---|---|---|
| | 4-Valency Titanium Compound | 3-0-Valency Titanium Compound | Potassium Compound | Basic Compound | Water |
| 2 | $TiO_2.1.7H_2O$ 0.9 | $Ti_2O_3$ 0.1 | KOH 1 | 0 | $H_2O$ 50 |
| 3 | $TiO_2.1.7H_2O$ 0.6 | $Ti_2O_3$ 0.4 | KOH 2 | 0 | $H_2O$ 50 |
| 4 | $TiO_2.1.7H_2O$ 0.2 | $Ti_2O_3$ 0.8 | KOH 2 | 0 | $H_2O$ 50 |
| 5 | $TiO_2.1.7H_2O$ 0 | $Ti_2O_3$ 1.0 | KOH 2 | 0 | $H_2O$ 50 |
| 6 | $TiO_2.1.7H_2O$ 0.8 | $TiCl_3$ 0.2 | KOH 2 | 0 | $H_2O$ 50 |
| 7 | $TiO_2.1.7H_2O$ 0.8 | TiO 0.2 | KOH 2 | 0 | $H_2O$ 50 |
| 8 | $TiO_2.1.7H_2O$ 0.8 | Ti 0.2 | KOH 2 | 0 | $H_2O$ 50 |
| 9 | $TiO_2$ 0.5 | $Ti_2O_3$ 0.5 | KOH 2 | 0 | $H_2O$ 50 |
| 10 | $TiCl_4$ 0.5 | $TiCl_3$ 0.5 | KCl 1 | NaOH 10 | $H_2O$ 30 |
| 11 | $TiO_2.1.7H_2O$ 0.7 | $Ti_2(SO_4)_3$ 0.3 | KOH 2 | 0 | $H_2O$ 50 |
| 12 | $TiO_2$ 0.6 | $TiCl_2$ 0.4 | KOH 2 | 0 | $H_2O$ 50 |
| 13 | $TiO_2.1.7H_2O$ 0.5 | $Ti_2O_3$ 0.5 | KOH 10 | 0 | $H_2O$ 100 |
| 14 | $Ti(SO_4)_2$ 0.5 | $Ti_2O_3$ 0.5 | KOH 10 | 0 | $H_2O$ 50 |

Table 2

| Example No. | Reaction Conditions and Products | | | | |
|---|---|---|---|---|---|
| | Reaction (° C) | Conditions (hr) | Dehydrating Means | Raw Materials (g) Except Water | Product (g) |
| 2 | 370 | 20 | Mg 10 g | 4 | 1.0 |
| 3 | 370 | 20 | Zn 10 g | 4 | 2.0 |
| 4 | 370 | 20 | Zn 10 g | 4 | 2.5 |
| 5 | 370 | 20 | Al 10 g | 4 | 1.0 |
| 6 | 370 | 20 | Mg 5 g | 4 | 1.5 |
| 7 | 370 | 20 | Zn 10 g | 4 | 2.0 |
| 8 | 370 | 20 | Zn 10 g | 4 | 2.0 |
| 9 | 370 | 20 | Mg 5 g | 4 | 1.5 |

Table 2-continued

Reaction Conditions and Products

| Example No. | Reaction (°C) | Conditions (hr) | Dehydrating Means | Raw Materials (g) Except Water | Product (g) |
|---|---|---|---|---|---|
| 10 | 370 | 20 | Zn 10 g | 4 | 1.0 |
| 11 | 370 | 20 | Zn 10 g | 4 | 2.0 |
| 12 | 370 | 20 | Zn 10 g | 4 | 2.0 |
| 13 | 250 | 50 | Physical Dehydrating by 0.8 g$H_2O$/hr | 20 | 0.8 |
| 14 | 370 | 20 | Zn 10 g | 4 | 0.8 |

COMPARATIVE EXAMPLE 1

2 g of titanium hydroxide (Ti(OH)$_4$) and a 1 N aqueous solution of potassium hydroxide were mixed to form a slurry with a molar K$_2$O/TiO$_2$ of 1.77, charged in a platinum tube and the tube was placed in an autoclave of 130 ml. Then 10 g of zinc was charged in the autoclave outside the platinum tube and sealed. The system was heated at 370° C for 20 hours and then allowed to stand for cooling to room temperature. 30 % by weight of the raw material was converted into fibrous potassium titanate having a length of 0.5 mm or more and a maximum length of 4 mm.

COMPARATIVE EXAMPLES 2 TO 12

The procedure of Comparative Example 1 was repeated except using an autoclave of 100 ml and using various compositions of raw materials, reaction conditions and dehydrating means as shown in Tables 3 and 4. In Comparative Example 6, a physical dehydrating method was used in which water was gradually removed from a valve at a rate of 1 g/hr. The quantity of the thus resulting fibrous potassium titanate was shown in Table 4.

Table 3

| Comparative Example No. | Composition of Raw Materials (Molar Ratio) | | | |
|---|---|---|---|---|
| | Titanium Compound | Potassium Compound | Basic Compound | Water |
| 2 | TiO$_2$.1.7H$_2$O  1 | KOH  0.5 | 0 | H$_2$O  50 |
| 3 | TiO$_2$.1.7H$_2$O  1 | KOH  1 | 0 | H$_2$O  50 |
| 4 | TiO$_2$.1.7H$_2$O  1 | KOH  2 | 0 | H$_2$O  50 |
| 5 | TiO$_2$.1.7H$_2$O  1 | KOH  4 | 0 | H$_2$O  50 |
| 6 | TiO$_2$.1.7H$_2$O  1 | KOH  10 | 0 | H$_2$O  100 |
| 7 | TiO$_2$  1 | KOH  1 | 0 | H$_2$O  50 |
| 8 | TiO$_2$  1 | KCl  1 | NaOH  2 | H$_2$O  50 |
| 9 | TiO$_2$  1 | K$_2$CO$_3$  1 | Na$_2$CO$_3$  10 | H$_2$O  10 |
| 10 | TiCl$_4$  1 | KCl  1 | NaOH  10 | H$_2$O  30 |
| 11 | TiCl$_4$  1 | KNO$_3$  1 | Ca(OH)$_2$  3 | H$_2$O  20 |
| 12 | Ti(SO$_4$)$_2$  1 | KOH  2 | Mg(OH)$_2$  2 | H$_2$O  20 |

| Comparative Example No. | Reaction (°C) | Conditions (hr) | Dehydrating Means | Raw Materials (g) (Except Water) | Product (g) |
|---|---|---|---|---|---|
| 2 | 350 | 30 | Mg 10 g | 4 | 0.8 |
| 3 | 370 | 20 | Zn 10 g | 5 | 3.2 |
| 4 | 370 | 20 | Al 10 g | 8 | 2.5 |
| 5 | 300 | 100 | Zn 10 g | 10 | 1.3 |
| 6 | 250 | 50 | Physical Dehydrating by 1 g H$_2$O/hr | 20 | 0.6 |
| 7 | 350 | 30 | Mg 5 g | 5 | 1.5 |
| 8 | 350 | 30 | Mg 10 g | 8 | 0.6 |
| 9 | 350 | 30 | Mg 30 g | 10 | 0.5 |
| 10 | 370 | 20 | Mg 10 g | 10 | 0.7 |
| 11 | 400 | 20 | Mg 5 g | 10 | 0.5 |
| 12 | 370 | 20 | Mg 5 g | 10 | 0.5 |

What is claimed is:

1. A process for the production of fibrous potassium titanate which comprises reacting a tetravalent titanium compound selected from the group consisting of titanium dioxide hydrates, titanium dioxide, titanium tetrahydroxide, titanium tetrachloride, titanium tetranitrate, titanium disulfate and mixtures thereof with a basis compound selected from the group consisting of potassium hydroxide, potassium carbonate, potassium chloride, potassium nitrate and mixtures thereof in an aqueous solution at a temperature of from 250° to 450° C and a pressure of from 20 to 400 atmospheres in the presence of at least one member selected from the group consisting of compounds of titanium having less than four valencies, metallic titanium and mixtures thereof and, during said reaction, mechanically or chemically removing water from the reaction system so that the content thereof is about 5 to 15% by weight wherein the molar ratio of the titanium in the titanium compounds : the potassium in the potassium compounds : the hydroxyl group or carbonate group in the basic compound : and water is in the range of 1:0.5 to 10:0 to 10:5 to 100, and wherein the molar ratio of the lower valency titanium compound or metallic titanium to the tetravalent titanium compound is a positive quantity between 0 and 1.0.

2. The process of claim 1, wherein the compounds of titanium having less than four valencies are $TiO_{2.0} \sim TiO_{1.90}$, $TiO_{1.80} \sim TiO_{1.70}$, $TiO_{1.56} \sim TiO_{1.48}$, $TiO_{1.25} \sim TiO_{0.69}$ and $TiO_{0.40} \sim Ti$.

3. The process of claim 1, wherein the compounds of titanium having less than four valencies are hydroxides, chlorides, nitrates and sulfates of $Ti^{3+}$ and $Ti^{2+}$.

4. The process of claim 1, wherein the tetravalent titanium compound is in situ formed by feeding an excess quantity of the compound of titanium having less than four valencies to the reaction system.

5. The process of claim 1, wherein the removal of a part of water is chemically carried out by adding to the reaction system a metal selected from the group consisting of potassium, sodium, calcium, magnesium, aluminum, zinc, chromium, iron, cobalt, nickel, tin, lead and mixtures thereof.

6. A process according to claim 1, wherein the reaction is carried out for a time period of from 3 to 60 hours.

* * * * *